United States Patent
Diamond

(10) Patent No.: US 10,149,456 B2
(45) Date of Patent: Dec. 11, 2018

(54) VERTICALLY MOVING PET BOWL APPARATUS

(71) Applicant: Norman Diamond, Deerfield, IL (US)

(72) Inventor: Norman Diamond, Deerfield, IL (US)

(73) Assignee: NEXTEK CORPORATION, Deerfield, IL (US)

( * ) Notice: Subject to any disclaimer, the term of this patent is extended or adjusted under 35 U.S.C. 154(b) by 365 days.

(21) Appl. No.: 15/072,157

(22) Filed: Mar. 16, 2016

(65) Prior Publication Data

US 2016/0316715 A1 Nov. 3, 2016

Related U.S. Application Data

(60) Provisional application No. 62/153,726, filed on Apr. 28, 2015.

(51) Int. Cl.
*A01K 39/04* (2006.01)
*A01K 5/01* (2006.01)
*F16M 11/24* (2006.01)

(52) U.S. Cl.
CPC .......... *A01K 5/0114* (2013.01); *F16M 11/24* (2013.01)

(58) Field of Classification Search
USPC ........ 119/61.57, 51.5, 61.5, 51.01; D30/121, D30/129, 133, 130; 248/127, 128, 129, 248/132; 212/80, 88, 92, 87, 97, 76
See application file for complete search history.

(56) References Cited

U.S. PATENT DOCUMENTS

| | | | | |
|---|---|---|---|---|
| 3,661,121 A * | 5/1972 | Zielin | ................... | A01K 5/0114 119/61.57 |
| 4,205,629 A * | 6/1980 | Wix | ..................... | A01K 5/0114 119/51.5 |
| 4,658,759 A * | 4/1987 | Brown | ................. | A01K 5/0114 119/61.5 |
| 4,976,223 A * | 12/1990 | Pierce | .................. | A01K 5/0114 119/61.56 |
| 5,501,176 A * | 3/1996 | Tully | ................... | A01K 5/0114 119/61.57 |
| 5,584,263 A * | 12/1996 | Sexton | ................. | A01K 5/0114 119/51.5 |
| D424,758 S * | 5/2000 | Akopdjanov | ................ | D30/129 |
| D424,759 S * | 5/2000 | Sipka | ........................ | D30/130 |
| 6,722,248 B1 * | 4/2004 | Johnston, Sr. | .......... | B27B 15/02 144/378 |

(Continued)

*Primary Examiner* — Andrea M Valenti
(74) *Attorney, Agent, or Firm* — Justin Lampel

(57) ABSTRACT

A vertically moving pet bowl apparatus has a vertical tower having a first support column and a second support column. A movable tray may be secured to and located between the first and second support column. The movable tray has a plurality of openings for receiving at least one pet food bowl and/or a water bowl. The movable tray moves vertically between the first and the second support columns so that a user can access the movable tray in the up position and then lower the movable tray to the lower position wherein the pet may gain access. The apparatus allows the user to avoid bending down to provide food/water to the pet and instead allows a user to deliver food and water to the pet from an upright standing position. A top console controls the movement of the movable tray in the up and down position.

14 Claims, 7 Drawing Sheets

(56) References Cited

U.S. PATENT DOCUMENTS

| | | | | |
|---|---|---|---|---|
| 7,318,391 B2* | 1/2008 | Brillon | ............... | A01K 5/0114 |
| | | | | 119/51.5 |
| 7,938,083 B1* | 5/2011 | Huether | ............... | A01K 5/0114 |
| | | | | 119/61.5 |
| 8,444,003 B2* | 5/2013 | Chen | ............... | A01G 9/02 |
| | | | | 119/61.5 |
| D695,974 S* | 12/2013 | Young | ............... | D30/130 |
| 8,776,725 B1* | 7/2014 | Grijalva | ............... | A01K 7/00 |
| | | | | 119/51.01 |
| 9,144,225 B1* | 9/2015 | Gaccione | ............... | A01K 7/00 |
| 9,226,478 B1* | 1/2016 | Uhl | ............... | A01K 5/0114 |
| 9,644,786 B2* | 5/2017 | Steiner | ............... | F16M 11/28 |
| D794,260 S* | 8/2017 | Tanumihardja | ............... | D30/133 |
| D800,396 S* | 10/2017 | Coviello | ............... | D30/133 |
| 2003/0106498 A1* | 6/2003 | Mersits | ............... | A01K 5/0142 |
| | | | | 119/61.53 |
| 2010/0147224 A1* | 6/2010 | Aletti | ............... | A01K 5/0114 |
| | | | | 119/61.57 |
| 2012/0285388 A1* | 11/2012 | Padia | ............... | A01K 5/0114 |
| | | | | 119/61.5 |
| 2013/0098924 A1* | 4/2013 | Tate | ............... | A47G 19/02 |
| | | | | 220/574 |
| 2015/0267859 A1* | 9/2015 | Carpenter | ............... | F16M 11/24 |
| | | | | 248/411 |

* cited by examiner

VERTICALLY MOVING PET BOWL APPARATUS

CROSS REFERENCE TO RELATED APPLICATIONS

The following application is based on U.S. provisional application Ser. No. 62/153,726 filed on Apr. 28, 2015, and claims the priority benefit of the '726 U.S. application; the entire contents of which are incorporated by reference.

BACKGROUND OF THE INVENTION

Many households have pets, such as dogs, who require daily feeding by placing and retrieving food and water bowls on the floor level. Many pet owners find it painful or difficult in bending over to accomplish this. The present device provides an apparatus to permit placing and retrieving pet food bowls from a standing position. A vertically moving pet bowl apparatus is hereby provided.

The apparatus has a vertical tower, having a first support column and a second support column. A movable tray may be secured to and located between the first support column and the second support column. The movable tray has a plurality of openings for receiving at least one pet food bowl and/or a water bowl. The movable tray moves vertically between the first and the second support columns so that a user can access the movable tray in the up position and then lower the movable tray to the lower position wherein the pet may gain access to the same. The apparatus allows the user to avoid having to bend down to provide food and water to the pet and instead allows a user to deliver food and water to the pet from an upright standing position. In like manner, the apparatus allows the user to retrieve the (empty) bowls from the lower position at the conclusion of the feeding. A top console secured between the first support column and second support column controls the movement of the movable tray in the up and down position. The device is further easily assembled and dissembled, without the use of tools, for shipping and storage. In an alternative embodiment, the device may have a single support column wherein the pet bowl trays are located on opposing sides of the single support column.

Movable pet dishes are known in the prior art. For example, U.S. Pat. No. 8,479,686 to Johnson discloses a pet feeding and watering system that dispenses pet food and water and has an adjustable height for people with limited mobility. The system has a base platform and a dual food and water dispenser. The dual food and water dispenser includes a vertical chute and a vertical hose. The vertical chute include a plurality of plastic or plexiglass panels that are spaced evenly from the top interior of the chute to the base of the chute in a zigzag configuration. The top of the chute has an open receptacle end where food and water are placed. The vertical hose is attached to the side of the chute by bracket fasteners and runs the length of the chute. The base of the chute includes a funnel mechanism that receives the vertical hose and directs water into a water dish. The chute includes at least one sliding component and one fixed component, where the fixed component has notches that engage a handle attached to the sliding component to secure the chute to the desired height. The pet feeding and watering system can also include a plastic pitcher, marked with incremental measurements, for pouring appropriate amounts of water into the water dispenser. When not in use, the pitcher rests in the chute's open receptacle end.

Further, U.S. Pat. No. 8,196,549 to Seagraves discloses assemblies suitable for mounting to, or being an integral part of, an animal enclosure such that the height of a valve-controlled liquid outlet may be adjusted according to the changing needs of growing animals. The adjustable liquid delivery assemblies comprise an elongated rail, a liquid delivery unit having at least one liquid delivery head slideably engaged with the elongated rail, a flexible liquid delivery tube for connecting a liquid delivery head to a liquid source, and a means for securing the liquid delivery unit at a selected position on the elongated rail.

Still further, U.S. Pat. No. 8,082,883 to Aletti discloses a pet food elevating device having a food platform and wheels coupled to the food platform with a vertical track positioned to slidably receive the wheels. A rope is movably engaged with an upper pulley positioned to allow the pet food elevating device to be raised to a desired elevation within the vertical track. A first end of the rope is coupled to the food platform, and a second end of the rope is available to a user of the pet food elevating device to raise or lower the food platform. The second end of the rope may be secured to hold the pet food elevating device at a desired elevation.

Still further, U.S. Pat. No. 5,584,263 to Sexton, provides a pet food dish elevating assembly comprising: a main housing unit formed as a generally rectangular shaped box with an essentially hollow interior, a front face and opposing sidewalls, the interior including an electrically powered motor and two large buttons operatively coupled to the motor, the buttons extending through the front face, an axle being rotatably coupled within the side walls and including at least two axle sprockets, a motor sprocket extending from the motor and coupled to a first axle sprocket by a horizontal chain, activation of the motor causing the motor sprocket to rotate thereby rotating the axle of the apparatus; and at least one vertical leg coupled to the main housing unit, a vertical chain being positioned within a leg and around a second axle sprocket, a tray formed in a generally L-shaped configuration being coupled to the vertical chain, a user depressing a first button to move the tray upwardly, a user depressing a second button to move the tray downwardly.

Previous, attempts have been made to provide a vertically moving pet bowl apparatuses. However, the prior art fails to describe a vertically moving pet bowl apparatus which is easy to use and efficient as is described in the present application. Further, these patents fail to provide a vertically moving pet bowl apparatus which allows the user, with minimal effort, to avoid bending over to provide food and/or water to a pet in the described manner.

SUMMARY OF THE INVENTION

A vertically moving pet bowl apparatus. The apparatus has a vertical tower having a first support column and a second support column. A movable tray may be secured to and located between the first support column and the second support column. The movable tray has a plurality of openings for receiving at least one pet food bowl and/or a water bowl. The movable tray moves vertically between the first and the second support columns so that a user can access the movable tray in the up position and then lower the movable tray to the lower position wherein the pet may gain access to the same. The apparatus allows the user to avoid having to bend down to provide food and water to the pet and instead allows a user to deliver food and water to the pet from an upright standing position. In like manner, the apparatus allows the user to retrieve the (empty) bowls from the lower position at the conclusion of the feeding. A top console secured between the first support column and second support column controls the movement of the movable tray in the up and down position. The device is further easily assembled and dissembled for shipping and storage.

Feeding a pet dog or cat can occur once or several times a day. In most instances, it involves providing a bowl with dry or moist food along with another bowl with clean water and placing them at floor level for access by the pet. However, many individuals, particularly elderly persons, because of age and/or medical reasons find it difficult and/or painful to bend over to place full bowls on the floor and to retrieve the empty ones subsequent to the pet feeding.

An advantage of the present vertically moving pet bowl apparatus is that the is present device is free standing and allows a user to provide food and/or water to a pet from an upright standing position with minimal effort and without the need to bend down.

And an advantage of the present vertically moving pet bowl apparatus is that the present device may be easily positioned in minimal space and may be easily and securely assembled for use with no tools and without household electrical connections.

Another advantage of the present vertically moving pet bowl apparatus is that present device may have at least one opening which permits receiving pet bowls of various sizes, utilizing a removable adjusting ring piece.

Still another advantage of the present vertically moving pet bowl apparatus is that the present device may allow a user to provide food and/or water to a pet in a level, controlled descent, without spilling the contents of the pet food bowls.

Yet another advantage of the present device is that the present device may be able to stop at intermediate positions between the first and second orientation to suit pet with various feeding heights.

An advantage of the present vertically moving pet bowl apparatus is that the present vertically moving pet bowl apparatus may be operated by readily accessible, available, replaceable batteries located at the top surface of the vertically moving pet bowl apparatus console.

Still another advantage of the present vertically moving pet bowl apparatus is that the present vertically moving pet bowl apparatus may have an illuminated multi-color indicator which informs the user that the batteries are good to use or if the device needs replacement batteries.

Still another advantage of the present device is that the present device may allow a pet to access the pet food bowl from either the front or the back of the device.

Another advantage of the present device is that, in an alternative embodiment, the vertically moving pet bowl apparatus may have a single column utilizing the same principles of operation and having the same advantages as described above.

Still another advantage is that the present device may have an integrated timing device which allows a user to deliver food and/or water to a pet at a predetermined time without manual intervention.

For a more complete understanding of the above listed features and advantages of the present vertically moving pet bowl apparatus reference should be made to the detailed description and the drawings. Further, additional features and advantages of the invention are described in, and will be apparent from, the detailed description of the preferred embodiments.

DETAILED DESCRIPTION OF THE PREFERRED EMBODIMENTS

A vertically moving pet bowl apparatus. The apparatus has a vertical tower having a first support column and a second support column. A movable tray may be secured to and located between the first support column and the second support column. The movable tray has a plurality of openings for receiving at least one pet food bowl and/or a water bowl. The movable tray moves vertically between the first and the second support columns so that a user can access the movable tray in the up position and then lower the movable tray to the lower position wherein the pet may gain access to the same. The apparatus allows the user to avoid having to bend down to provide food and water to the pet and instead allows a user to deliver food and water to the pet from an upright standing position. In like manner, the apparatus allows the user to retrieve the (empty) bowls from the lower position at the conclusion of the feeding. A top console secured between the first support column and second support column controls the movement of the movable tray in the up and down position. The device is further easily assembled and dissembled for shipping and storage.

Figure 1:
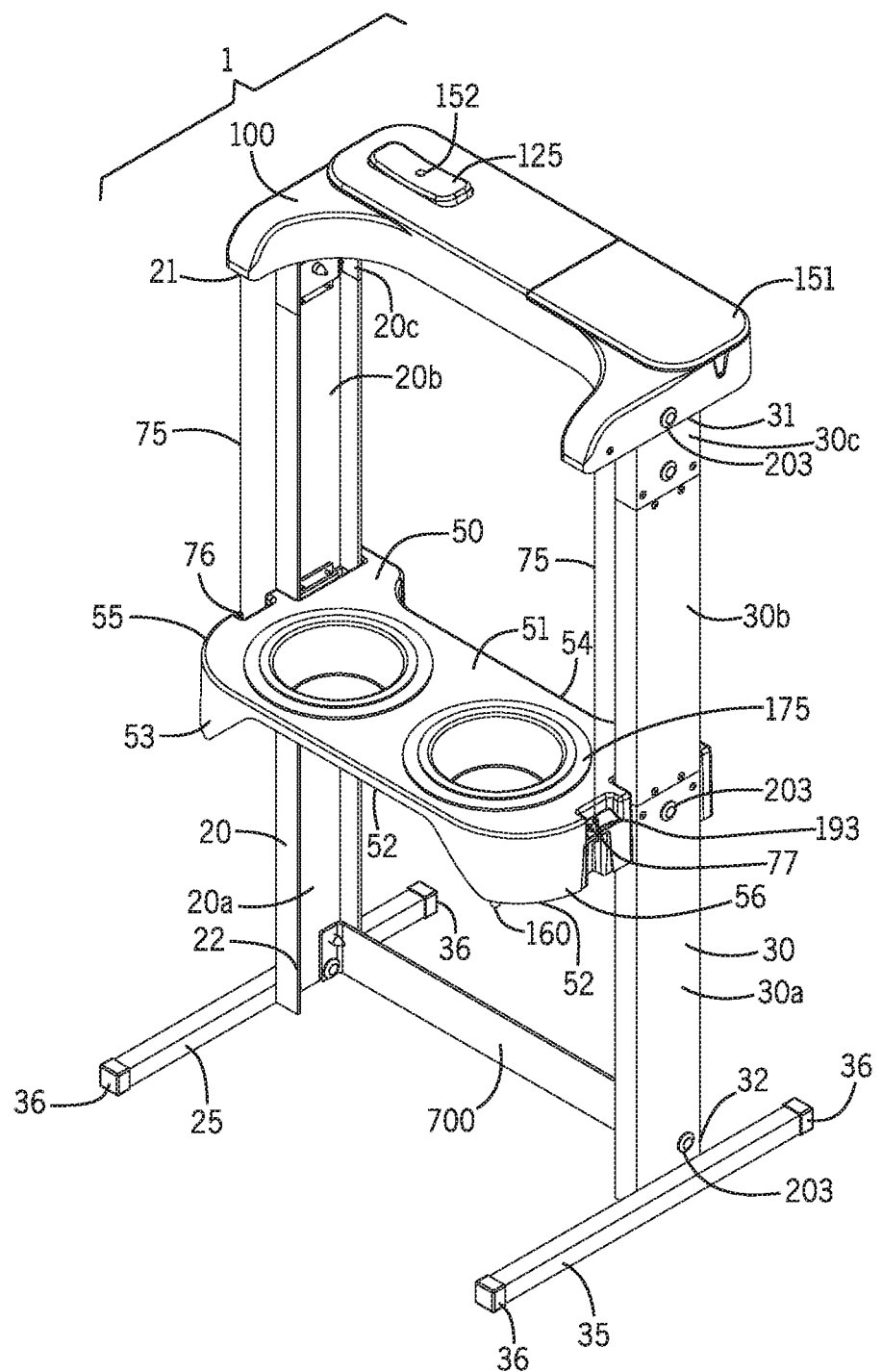
FIG. 1 illustrates a perspective view of the vertically moving pet bowl apparatus wherein the movable tray is between a first (or "upper") orientation and a second (or "lower") orientation.
Figure 4:
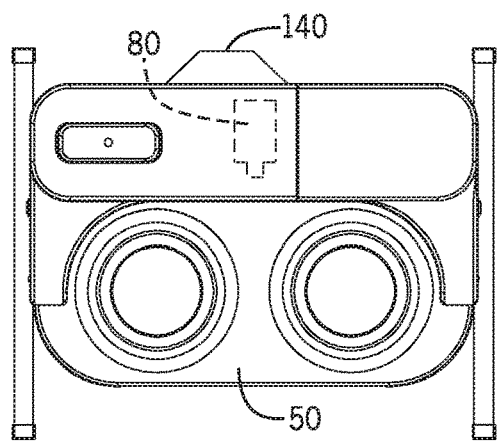
FIG. 4 illustrates a top view of the vertically moving pet bowl apparatus.
Figure 5:
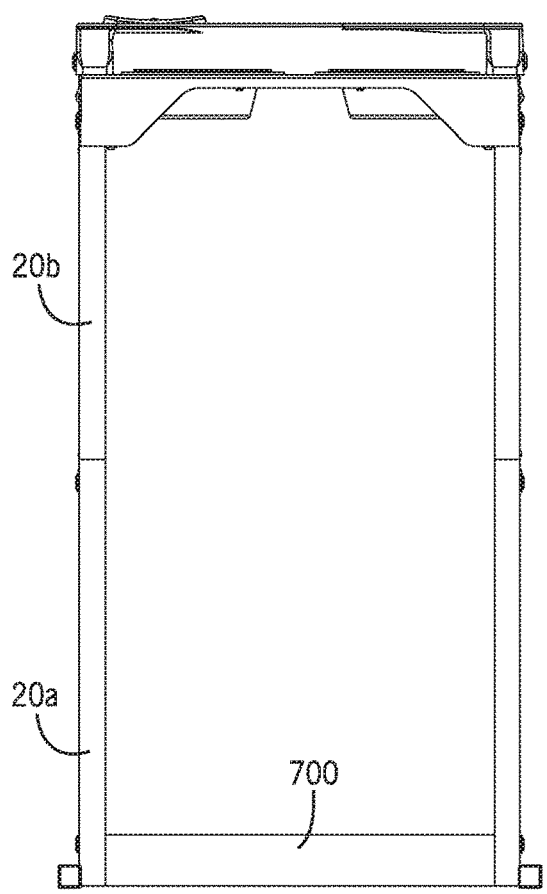
FIG. 5 illustrates a view of the front of the vertically moving pet bowl apparatus.

Referring first to FIG. 1, in an embodiment a vertically moving pet bowl apparatus 1 is provided. The vertically moving pet bowl apparatus 1 may have a movable tray portion 50, a top console 100 (or "control panel") which secures the motor 80 (FIG. 4) and other electronics as described below, a first support column 20 (comprising elements 20a/20b) and a second support column 30 (comprising elements 30a/30b). Preferably, the first support column 20 and the second support column 30 may be generally elongated rectangular columns, constructed in one or more sections securely fastened together to make the required support column. In an embodiment, the first support column 20 and the second support column 30 may be made substantially from, for example, aluminum. The support columns 20, 30 may provide vertical strength to support the top console 100 which in turn supports the movable tray portion 50. In an embodiment, the top console 100 may have extended supports 20c and 30c which lock into the support columns 20, 30.

Figure 2:
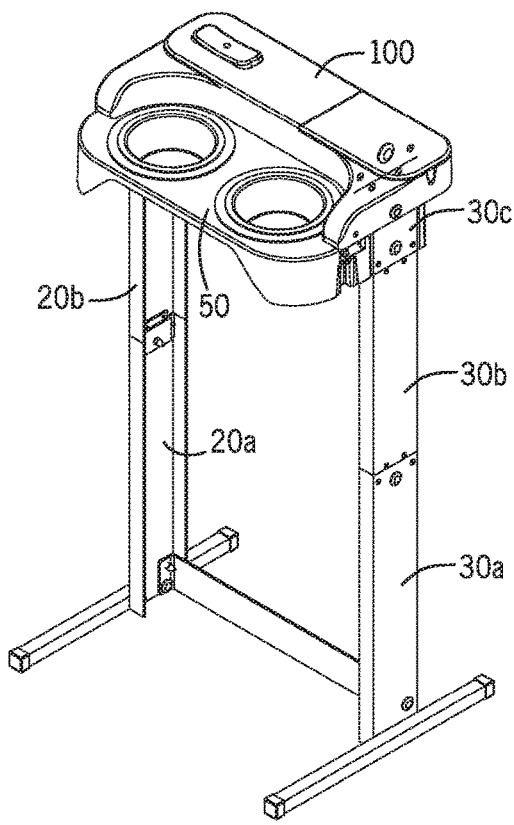
FIG. 2 illustrates a perspective view of the vertically moving pet bowl apparatus wherein the movable tray is in the first (or "upper") orientation.
Figure 3:
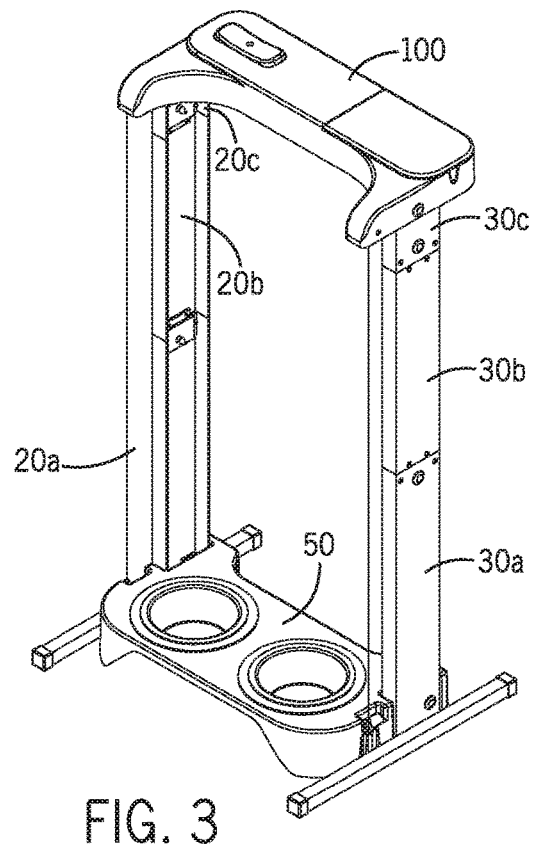
FIG. 3 illustrates a perspective view of the vertically moving pet bowl apparatus wherein the movable tray is in the second (or "lower") orientation.

The first support column 20 (when fully assembled from the smaller subunits) may have a first end 21 and a second end 22. The second support column 30 (when fully assembled from the smaller subunits) may have a first end 31 and second end 32. In an embodiment, the first support column 20 and the second support column 30 may be of substantially the same size and may run parallel to each other. In FIGS. 1, 2 and 3, each column is shown wherein each column may be made in one or more sections which are interlocked to form a single rigid column. The device 1, when the columns 20, 30 are fully assembled and when the top console 100 is secured to the columns 20, 30, are approximately equal in height to the height of a dining table. As a result, the movable tray portion 50 (when in the 'up' position) may be easily accessed by a person in a standing position for inserting or removing food and/or water bowls, as well as cleaning the movable tray portion 50 and the food and/or water bowls. The movable tray portion 50 may then be lowered to the second orientation (as illustrated in FIG. 3) so that the pet may gain access to the food and/or water.

In an embodiment, the first end 21 of the first support column 20 and the first end 31 of the second support column 30 may be completely separated from the top console 100. As a result, the device 1 may be easily assembled, disassembled and stored or transported easily in a compact manner. A plurality of tool free twisting push rivets 203 (for example) may allow the user to easily assemble the components.

In an embodiment, a first foot brace 25 may be secured to the first support column 20 and a second foot brace 35 may be secured to the second support column 30. The first foot brace 25 and the second foot brace 35 may each have caps 36 at their distal ends which prevent scratching of a floor by the device 1 if moved. Further, the caps 36 may be made from rubber which may therein prevent a pet from pushing the device 1 along a floor due to the increased friction of the rubber. The first foot brace 25 may be secured to the second end 22 of the first support column 20 while the second foot brace 35 is secured to the second end 32 of the second support column 30. The first foot brace 25 may run perpendicular to the first support column 20 and the second foot brace 35 may run perpendicular to the second support column 30. Ideally, the first support column and the second support column 30 are slightly off-set from the dead center of the first foot brace 25 and second foot brace 35 so as to better stabilize the device 1. In an embodiment, a brace bar 700 (or "cross brace") may be connected to the first foot brace 25 and the second foot brace 35 to stabilize the device 1 and provide the required dimensional distance between the two columns 20, 30 and further prevent movement of the first column 20 with respect to the second column 30 which could otherwise inhibit the proper smooth movement of the movable tray portion 50 in the upward or downward manner. In an embodiment, the brace bar 700 has a length substantially equal to a length of the top console 100.

Figure 7:
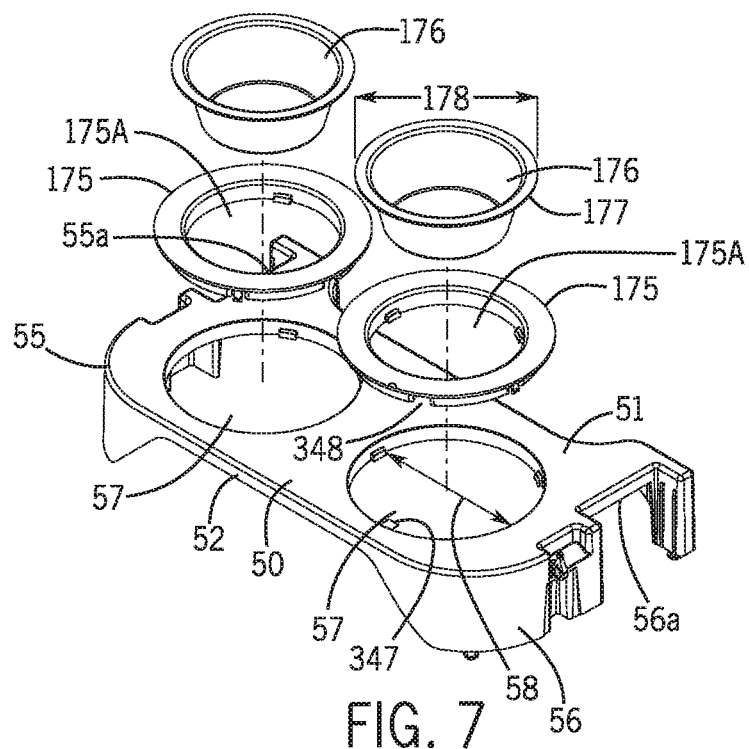
FIG. 7 illustrates an exploded view of the movable tray portion of the vertically moving pet bowl apparatus.

As stated above, the vertically moving pet bowl apparatus 1 may have a movable tray portion 50. The movable tray portion 50 may have a top 51, a bottom 52, a front 53, a back 54, a first side 55 and a second side 56. At least one opening 57 (FIG. 7) may be present on the top 51 of the movable tray portion 50. The figures generally illustrates the movable tray portion 50 having two openings 57 (each suitable to hold bowls for food or water); although the movable tray portion 50 may utilize more or less openings 57 for multiple bowls. The openings 57 may extend from the top 51 to the bottom 52 of the movable tray portion 50 creating a generally circular opening having a diameter 58 (FIG. 7).

In an embodiment, the movable tray portion 50 may move from a first orientation (FIG. 2) to a second orientation (FIG. 3). In the first (or "upper") orientation food and/or water pet bowls 176 (FIG. 7) may be positioned within the movable tray portion 50. Then, by manual depression (in a standing and upright position for the user) of a switch actuator 125, depression of which unlocks the movable tray 50 from its first orientation, a motor power 80 in the console 100 allows for a leveled and controlled descent of the movable tray 50 to the second ("lower") orientation, or anywhere in-between, wherein the pet bowls 176 may be accessible to a pet. As stated above, the top console 100 is approximately the height of a standard table so as to allow a user, upright and standing, to position the bowls 176 and operate the motion selector switch 125 without the need to bend over. Further, in an embodiment, a user may position the movable tray 50 at any intermediate position between the first orientation and second orientation (like illustrated in FIG. 1) to accommodate pets of various sizes by releasing the switch 125. More specifically, the user may release the motion selector switch 125 while the movable tray 50 is in an intermediary position between the top and the bottom of the device. In the event that the switch 125 is not released when the movable tray 50 reaches either the upper or lower orientation automatic limit switches are activated to remove power from and stop the motor 80.

Figure 8:
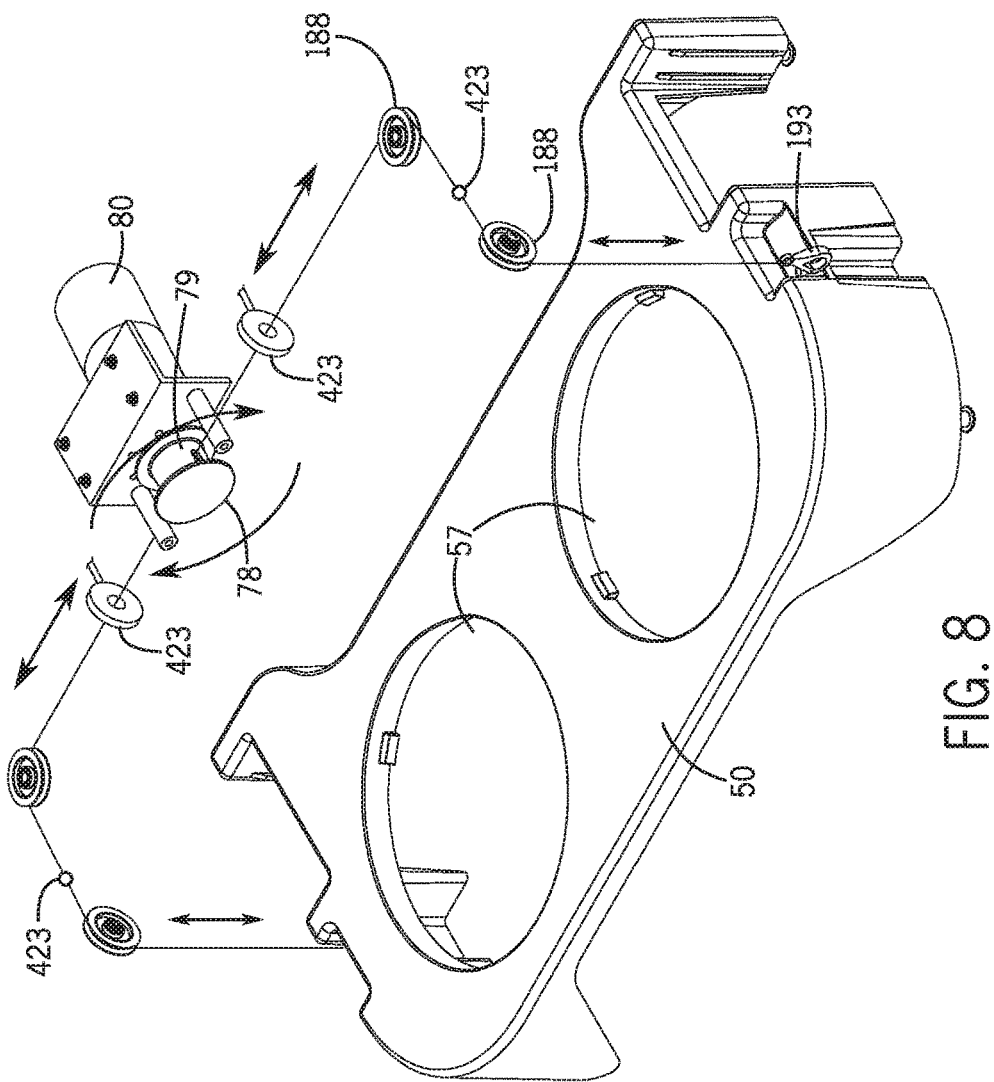
FIG. 8 illustrates a perspective view of the cable and cord pulley system of the present vertically moving pet bowl apparatus in connection with the movable tray.

Referring now to FIGS. 1 and 8, in an embodiment, a first end 76 of a single length of cable, rope, chain or the like 75 may be secured to the movable tray portion 50 at the first side 55 of the movable tray portion 50. A second end 77 of the cable, chain or the like 75 may be secured to the second side 56 of the movable tray portion 50. The cable, chain or the like 75 may pull the movable tray portion 50 upward from the second (lower) orientation to the first (upper) orientation. In an embodiment, the cable, rope, chain or the like 75 may be secured to the movable tray portion 50 by, for example, a clasp 193 (having a spring loaded closure known as a lobster claw hook). The clasp 193 may allow the rope, chain or the like 75 to easily be removed from the sides 55, 56 of the movable tray portion 50 so that the movable tray portion 50 may be completely removed from the rest of the device and cleaned and/or replaced. The movable tray portion 50 is further balanced along a centerline so as to reduce possible friction and racking between the first column 20 and second column 30 during upward and downward movement.

Figure 9:
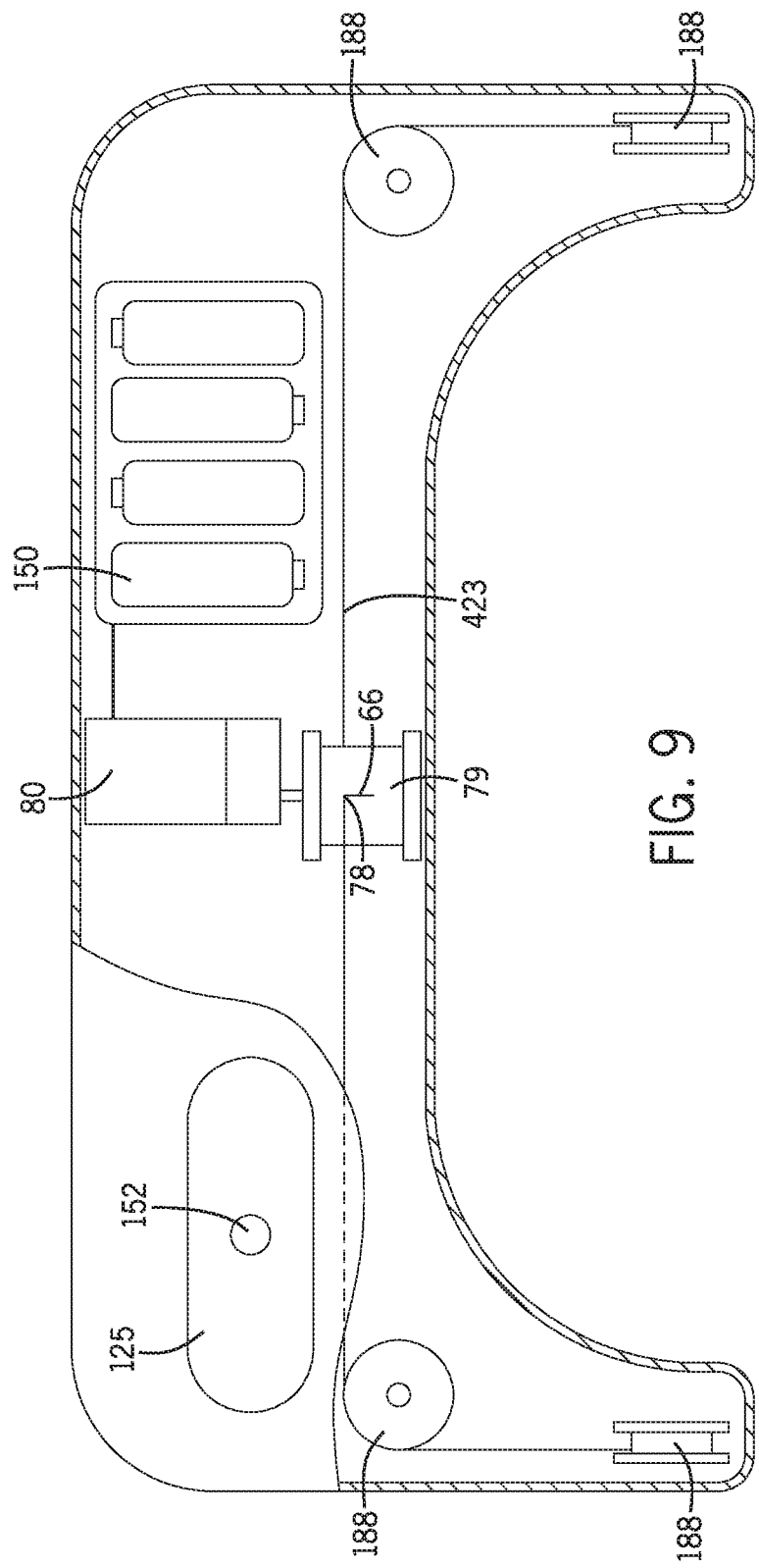
FIG. 9 illustrates a view of the interior components of the console.

In an embodiment, a middle portion 78 (FIG. 8) of the cable, rope, chain or the like 75 may be secured around a rotating cylindrical pulley 79 which is attached to a bi-directional motor 80 capable of rotating in both directions. In an embodiment, the rotating cylindrical pulley 79 (activated by the motor 80) may wrap the cable, rope, chain or the like 75 around the same and may pull the movable tray portion 50 upward. Alternatively, when the cable, rope, chain or the like 75 is partially wrapped around the rotating cylindrical pulley 79 and the motor 80 directional rotation is reversed, the movable tray 50 may then descend by gravity at a fixed rate of vertical travel. Further, a series of pulleys 188 (FIG. 8) may be used to redirect the movement and location of the cable, rope, chain or the like 75. In an embodiment, the rotating cylindrical pulley 79 has a slit (or opening) 66 (FIG. 9) in which the cable, rope, chain or the like 75 runs through so that the turning of the rotating cylindrical pulley 79 wraps the cable, rope, chain or the like 75 around the pulley 79. A plurality of guiding loops 423 (FIG. 8) which are secured within the top console 100 (but not visible from the top, side or back of the device) may properly guide the cable, rope, chain or the like 75 between the movable tray portion 50 and the rotating cylindrical pulley 79 so as to avoid tangling.

Located on the top console 100 may be a power switch actuator button (or "rocker" switch) 125. The power switch actuator button 125 may have three spring loaded positions: an "up" position, a middle (default-no travel) position and a "down" position. When no manual pressure is applied to the power button 125, the power button 125 remains in the middle (default) position wherein the movable tray 50 does not move. In an embodiment, pressing the "up" position, for example, may cause the rotating cylindrical pulley 79 to turn which therein pulls the cable, rope, chain or the like 75 connected to the movable tray portion 50 upward. Pressing the power button 125 on the "down" position may, for example, reverse the direction of the rotating pulley 79 causing the cable, rope, chain or the like 75 to unwind, allowing the movable tray portion 50 to slowly descend toward the second orientation by, gravity.

In an embodiment, the power button 125 may be opaque, translucent or transparent and may have an internal light indicator 152 allowing the user to visually see not only if batteries 150 (FIG. 9) secured within a battery holder 151 (FIG. 1) are still functional, but may also inform the user if the movable tray portion 50 is currently in motion upward or downward. The light indicator 152 may be multicolored showing, for example, "green" indicating sufficient power and that the device 1 is on and "red" indicating low power. In an embodiment, a limit circuit may be electrically connected to the motor 80 such that if a user continues to press the power switch actuator button 125 while the movable tray 50 is either fully in the first (or "upper") orientation or fully in the second (or "lower") orientation, the motor 80 will not respond and therein damage to the motor 80 and the device 1 is prevented.

Figure 6:
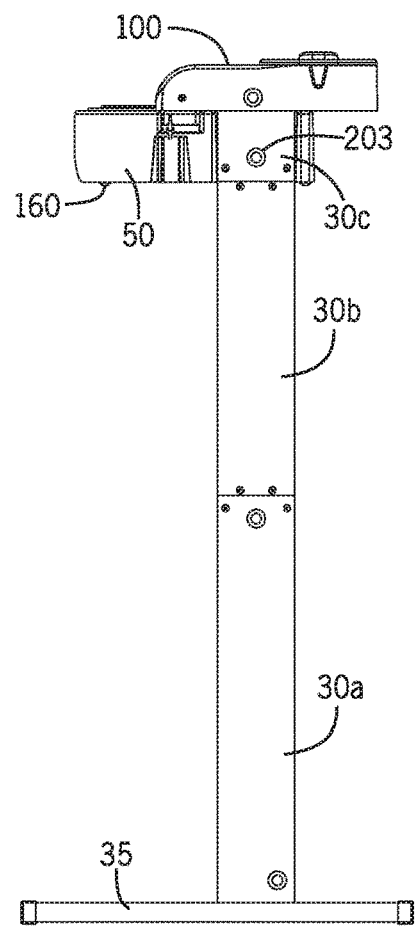
FIG. 6 illustrates a side view of the vertically moving pet bowl apparatus.

In an alternate embodiment, the device 1 may have an automatic, battery operated, electronic timing device 140 (FIG. 6). The automatic timer 140 may allow a user to preprogram the device 1 so that the movable tray portion 50 automatically moves down to the second position without the need to manually press the power button 125. As a result, a user may fill the bowls 176 of the movable tray portion 50 with food and water and may leave the device 1 unattended wherein the device 1 may still be able to provide food and/or water for a pet at a predetermined time, including when the pet's owner may be away from home. Ideally, the pet bowls 176 are approximately one quart in capacity, but may vary depending on the size of the pet being fed.

Figure 7A:
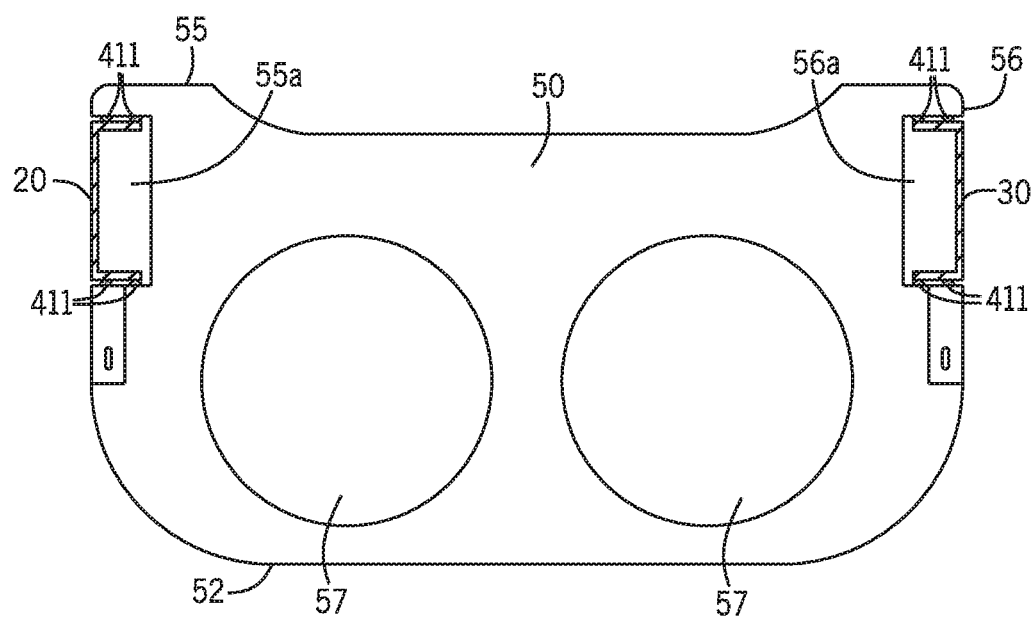
FIG. 7a illustrates atop view of the movable tray portion and across section of the first column and the second column.

Referring now to FIGS. 7 and 7a, in an embodiment, the movable tray portion 50 may have a plurality of various sized removable support rings 175. The various sized removable support rings 175 may have an opening 175A for receiving a pet bowl 176. The various sized removable support rings 175 may allow a user to utilize his or her own pet bowls 176 or bowls having various sized diameters 178 so that the same may fit within the openings 57 of the top 51 of the movable tray portion 50. In an embodiment, the pet bowls 176 may have an exterior lip portion 177. The exterior lip portion 177 may be located at the top of the pet bowls 176 and may be used to secure the bowls 176 within the more narrow diameters 58 of the openings 57 or within the removable support rings 175.

In an embodiment, the various sized removable support rings 175 are magnetic and are attracted to the top 51 of the movable tray portion 50 (which may be metal in an embodiment) so that the support rings 175 do not shift and therein better secure the pet bowls 176 to the movable tray 50. Further, in yet another embodiment, an extended protrusion 347 may correspondingly snap into a recess 348 in the support ring 175 or pet bowl 176 (FIG. 7 only shows the recess 348 in the support ring 175) so that rotational movement of the support ring 175 and or pet bowl 176 is reduced while the pet is feeding. It is understood that more than one protrusion 347 and corresponding recess 348 may be utilized in each opening 57.

In an alternative embodiment, the first side 55 and the second side 56 of the movable tray portion 50 may each have a recessed section 55a and 56a, respectively. The recessed sections 55a, 56a receive a portion of the first column 20 and second column 30. In the alternative embodiment of FIG. 7a, within the recessed portions 55a, 56a may each have four protruding smooth rounded elongated ridges 411. The protruding smooth rounded elongated ridges 411 may provide a smooth minimal surface to reduce friction and allow the movable tray portion 50 to slide up and down the columns 20, 30 with substantially reduced friction.

In an embodiment, the bottom 52 of the movable tray portion 50 may have bumpers 160 (FIG. 1). Preferably, each bumper 160 is rubber. The bumpers 160 may prevent the bottom 52 of the movable tray portion 50 from directly contacting the floor in the "down" orientation. In particular, the bumpers 160 may prevent the major portion of the movable tray portion 50 from coming in direct contact with any contaminants which may be present on the floor.

Figure 10:
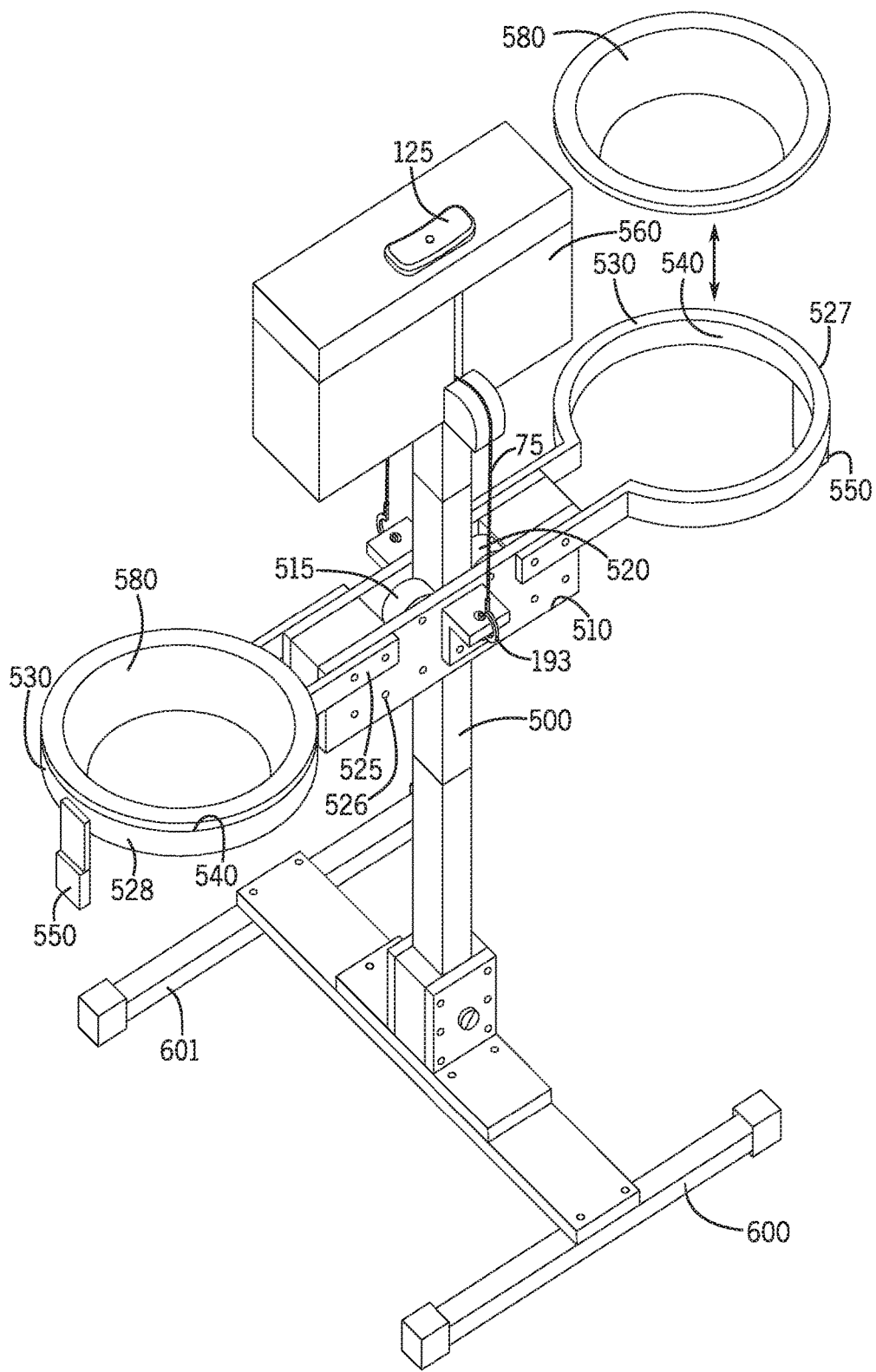
FIG. 10 illustrates an alternative embodiment of the vertically moving pet bowl apparatus wherein the device has a single column.

Referring now to FIG. 10, in an alternative embodiment, the device may have a single central column 500, which may be composed of interlocking sections. A movable frame 510 may move vertically up and down the single central column 500. The movable frame 510 may have a first side 527 and a second side 528 which may be mirror images of each other. The first side 527 and the second side 528 may extend perpendicularly with respect to a first leg support 600 and a second leg support 601 so that the device 1 is balanced and resistant to tipping over. In particular, the first side 527 and the second side 528 of the movable frame 510 may move upward and downward within the space between the first leg support 600 and the second leg support 601. The movable frame 510 may have a central opening 520 which has two rollers 515 on each side which allow the movable frame 510 to move vertically along the single central column 500 in virtually a frictionless manner.

The movable frame 510 may be secured to a top console 560 with cables 75 in a manner similar to the embodiments of FIGS. 1-9, Located on the movable frame 510 may be a plurality of circular openings 526 which may receive a securing device for a bowl holding device 530 having a grasping mechanism 525. The bowl holding device 530 may have an opening 540 for temporarily receiving a removable pet bowl 580. FIG. 10 illustrates the device with one bowl 580 utilized in the bowl holding device 530 and a second bowl 580 being inserted into the opposing bowl holding device 530. The bowl holding device 530 may have a foot 550 on its distal end which may contact the ground and provide greater stability for the device and may further prevent scratching of the floor of the user.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

I claim:

1. A vertically moving pet bowl apparatus comprising:
a top console wherein the top console has a top surface, a bottom surface, a first side, a second side, a front, a back and an interior;
a first support column wherein the first support column has a top, a bottom, a first side, a second side, a front and a back;
a second support column wherein the second support column has a top, a bottom, a first side, a second side, a front and a back;
wherein the bottom of the top console is secured to the top of the first support column and further secured to the top of the second support column;
a movable tray having a first side, a second side, a top and a bottom wherein the movable tray is secured between the first support column and the second support column wherein the movable tray has at least one opening having a diameter and wherein the opening temporarily receives a removable pet bowl;
wherein the movable tray moves from a first position near the top of the first support column and near the top of the second support column to a second position near the bottom of the first support column and near the bottom of the second support column;
a rotating motor located within the top console;
a first and a second pulley located in the top console;
wherein the rotating motor pulls or releases a single continuous cable which partially wraps around a cylindrical tube attached to the rotating motor and wherein the single continuous cable passes through the first pulley and the second pulley and wherein the single continuous cable has a first free end and a second free end and wherein the first free end is removably connectable to the first side of the movable tray and wherein the second free end of the single continuous cable is removably connectable to the second wherein said first and second free ends extend from said top console at a position spaced a distance forward from said first and second support columns towards said front of said top console wherein the single continuous cable lifts or lowers the movable tray; a first notch and a second notch located in and spaced along the first side of the movable tray; a first notch and a second notch located in and spaced along the second side of the movable tray; and wherein the first notch of the first side and the first notch of the second side of the movable tray temporarily secure the single continuous cable and wherein the second notch of the first side and the second notch of the second side of the movable tray act as a guides for the movable tray to move along the first support column and the second support column.

2. The vertically moving pet bowl apparatus of claim 1 further comprising:
a first foot brace secured to the bottom of the first support column and a second foot brace secured to the bottom of the second support column wherein the first foot brace is perpendicular with respect to the first support column and wherein the second foot brace is perpendicular with respect to the second support column.

3. The vertically moving pet bowl apparatus of claim 2 further comprising:
a rubber cap at a distal end of the first foot brace and a rubber cap located at a distal end of the second foot brace.

4. The vertically moving pet bowl apparatus of claim 1 further comprising:
a generally rectangular brace bar secured between the first support column and the second support column wherein the generally rectangular brace bar is perpendicular with respect to the first foot brace and the second foot brace.

5. The vertically moving pet bowl apparatus of claim 1 wherein the first support column and the second support column are each subdivided in a plurality of interlocking subunits.

6. The vertically moving pet bowl apparatus of claim 1 further comprising:
a removable ring having an opening having a diameter wherein the removable pet bowl is temporarily secured within the opening of the removable ring and wherein the diameter of the opening of the removable ring is less than the diameter of the opening of the movable tray.

7. The vertically moving pet bowl apparatus of claim 6 further comprising:
an indentation along an exterior circumference of the removable ring; and
an extended protrusion located within the opening of the movable tray wherein the extended protrusion correspondingly fits within the indentation of the exterior circumference of the removable ring and wherein the temporary interlocking of the extended protrusion of the opening of the movable tray with the indentation of the removable ring prevents the removable ring from rotating.

8. The vertically moving pet bowl apparatus of claim 6 wherein the removable ring is magnetic and wherein the removable ring is temporarily magnetically attracted to the top of the movable tray.

9. The vertically moving pet bowl apparatus of claim 1 further comprising:
a first claw clip secured to a first end of the cable and a second claw clip secured to a second end of the cable wherein the first claw clip secures the first end of the cable to the first side of the movable tray and therein the second claw clip secures the second end of the cable to the second side of the movable tray.

10. The vertically moving pet bowl apparatus of claim 1 further comprising:
a rubber stopper located on the bottom of the movable tray wherein the rubber stopper prevents the movable tray from directly contacting the ground.

11. The vertically moving pet bowl apparatus of claim 1 wherein the movable tray may be stopped in an intermediary position between the first position and the second position.

12. The vertically moving pet bowl apparatus of claim 1 further comprising:
an opening indentation on the first side of the movable tray and an opening indentation on the second side of the movable tray wherein the opening indentation on the first side of the movable tray and the opening indentation on the second side of the movable tray each partially receives a portion of the first support column and a portion of the second support column respectively.

13. The vertically moving pet bowl apparatus of claim 12 further comprising:
a plurality of bumps located within the opening indentation of the first side of the movable tray and a plurality of bumps located within the opening indentation of the second side of the movable tray wherein the plurality of bumps are capable of preventing the first support column and second support column from contacting the movable tray in a flush manner.

14. The vertically moving pet bowl apparatus of claim 1 wherein the cable lowers the movable tray by gravity.

\* \* \* \* \*